United States Patent [19]

Passereau

[11] 4,087,183

[45] May 2, 1978

[54] SPECTROGRAPH

[75] Inventor: Genevieve Passereau, Bourg-la-Reine, France

[73] Assignee: Instruments S.A., Ivry-sur-Seine, France

[21] Appl. No.: 670,567

[22] Filed: Mar. 25, 1976

[30] Foreign Application Priority Data

Dec. 10, 1975 France .................................. 75 37803

[51] Int. Cl.² .............................................. G01J 3/18
[52] U.S. Cl. .................... 356/79; 350/162 R
[58] Field of Search ............... 350/162 R; 356/79, 99, 356/100

[56] References Cited

U.S. PATENT DOCUMENTS 3,628,849  12/1971  Flamand et al. ................... 356/79 X
3,791,737   2/1974  Johansson ............................ 356/79

Primary Examiner—F. L. Evans
Attorney, Agent, or Firm—Haseltine, Lake & Waters

[57] ABSTRACT

A spectrograph for use in analyzing an extended spectral field comprising a dispersive system consisting solely of one or more concave holographic gratings, each grating being specified so that the diffraction spectrum is formed in a plane. Where a plurality of gratings are provided they are formed on a common concave support and are specified so that the planes of the diffraction spectra formed thereby are offset and in total cover the wavelengths of the total spectral field.

3 Claims, 3 Drawing Figures

4,087,183

SPECTROGRAPH

FIELD OF THE INVENTION

The present invention refers to a spectrograph for the analysis of the wavelengths of a complex light and more particularly a spectrograph in which the spectrum is formed on a plane surface.

BACKGROUND

Various dispersive systems are known which form a plane spectrum. The most usual system may consist of one or a number of prisms on which the light in the form of a parallel beam is caused to fall. But, if it is required to employ such a system with a point source, an input collimator optical system and an output focusing optical system are needed to enable the formation of an image of the spectrum. A plane dispersive grating may also be employed instead of the prism but it must likewise be completed by input and output optical systems. The use of such supplementary optical systems introduces risks of parasitic light and loss of luminousity and increases the cost of the apparatus.

Spectrographs are likewise known which employ as dispersive systems concave spherical engraved or holographic gratings which do not need collimator or focusing optical systems. In spectrographs of this kind the point source of the light to be analysed is placed on the Rowland's circle, that is to say, on the circle of diameter half that of the spherical cup of the grating and located in a diametral plane of this cup perpendicular to the lines of the grating. The spectrum is then likewise formed on the Rowland's circle and the detector, such as a photographic plate, intended for analysing the various wavelengths of the spectrum must be curved, which poses ticklish technical problems.

Certain types of holographic gratings have also been made which display better qualities of stigmatism, in which the point source of the light to be analysed may be placed outside the Rowland's circle, but the spectrum is then formed on still more complicated curves and again the difficulty of detecting the spectrum by normal detectors prevents the use of these gratings for spectrographs intended to cover an extended spectral field.

Hitherto when the extent of the spectral field to be analysed makes it practically compulsory to form a plane spectrum, in spite of their disadvantages, apparatus with prisms or plane gratings completed by auxiliary optical systems have always been employed.

SUMMARY OF THE INVENTION

It is an object of the present invention to provide a spectrograph which does not require auxiliary optical systems and which employs normal detectors.

According to one aspect of the present invention there is provided a spectrograph for an extended spectral field, including means for defining a source of light to be analysed and a dispersive system, wherein the dispersive system consists solely of a concave holographic grating specified so that the diffraction spectrum is formed on a plane surface.

According to another aspect of the present invention there is provided a spectrograph for an extended spectral field, including means for defining a source of light to be analysed and a dispersive system, wherein the dispersive system consists of a plurality of holographic gratings provided on one concave support and specified so that the respective diffraction spectra are formed on plane surfaces offset with respect to one another.

BRIEF DESCRIPTION OF THE DRAWING

The invention will be more fully understood from the following description of embodiments thereof, given by way of example only, with reference to the accompanying drawing.

In the drawing:

FIG. 1 is a three-dimensional view with the reference trihedron OXYZ.

FIG. 2 is confined to the plane XOY; and

DETAILED DESCRIPTION

Figure 1:
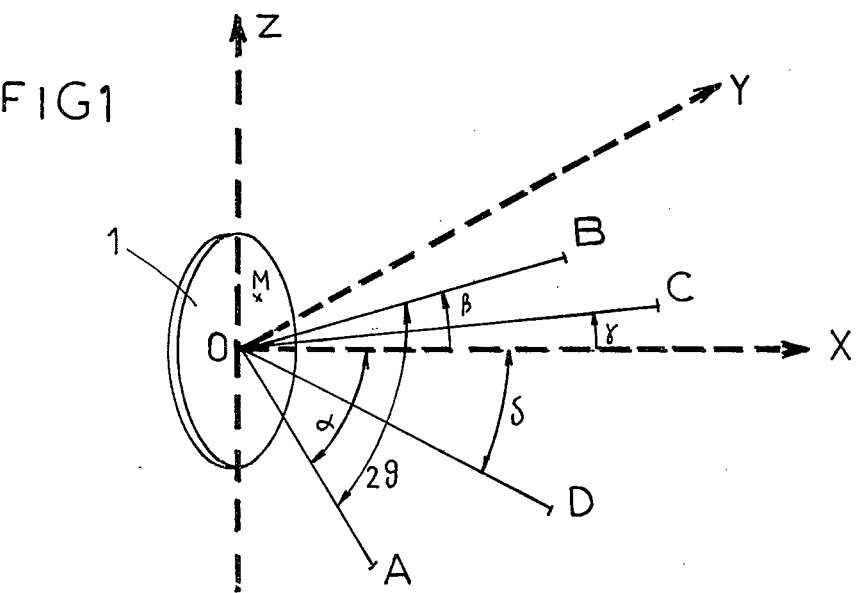
FIGS. 1 and 2 define the axes of reference coordinates and the dimensional notations employed in the following calculation for determining the characteristics of a holographic grating.

It is known that to register a holographic grating on a supporting surface an interference system is established between two light-beams proceeding from two coherent sources; the equiphase lines constituted by the intersection of the interference surfaces with the supporting surface determine the lines of the grating, after selective solution of a photopolymerizable resin previously deposited on the support. Referring to FIG. 1 a holographic grating of this kind has been registered on a concave spherical surface 1, starting from point sources C and D the polar coordinates of which in the plane XOY are respectively $1_C\gamma$ and $1_D\delta$ and emit on the registration wavelength $\lambda_o$. In the employment of the grating as a spectrograph, the source to be analysed is placed at the point A of coordinates $1_A\alpha$, and for each wavelength $\lambda$ an image is formed at B ($1_B\beta$). B is the perfect image of A if the optical path MA + MB remains constant whatever the coordinates XYZ of the point M on the grating, or more precisely along a groove in the grating, this optical path varying by $k\lambda$ from one groove to the other, $k$ being the spectral order.

In general, aberrations persist which are characterized by the optical path having an aberration of $\Delta$ which it is known can, for concave holographic gratings, be put in the following form where P is a constant.

$$\Delta = MA + MB - k\lambda/\lambda_o(MC - MD) - P$$

For a spherical concave grating of radius R it has been established that the optical path having an aberration of $\Delta$ could be put in the following form:

$$\Delta = -Y\left(H - \frac{k\lambda}{\lambda_0}H'\right) + \frac{Y^2}{2}\left(T - \frac{k\lambda}{\lambda_0}T'\right) + \frac{Z^2}{2}\left(A - \frac{k\lambda}{\lambda_0}A'\right) + \frac{Y^3}{2}\left(C_1 - \frac{k\lambda}{\lambda_0}C'_1\right) + \frac{YZ^2}{2}\left(C_2 - \frac{k\lambda}{\lambda_0}C'_2\right) + \ldots \quad (1)$$

in which:

$$H = \sin\alpha + \sin\beta; \quad H' = \sin\gamma - \sin\delta$$

-continued $$T = \frac{\cos^2 \alpha}{l_A} - \frac{\cos \alpha}{R} + \frac{\cos^2 \beta}{l_B} - \frac{\cos \beta}{R} \; ; T' = \frac{\cos^2 \gamma}{l_C} - \frac{\cos \gamma}{R} - \left( \frac{\cos^2 \delta}{l_D} - \frac{\cos \delta}{R} \right)$$

$$A = \frac{1}{l_A} - \frac{\cos \alpha}{R} + \frac{1}{l_B} - \frac{\cos \beta}{R} \; ; A' = \frac{1}{l_C} - \frac{\cos \gamma}{R} - \left( \frac{1}{l_D} - \frac{\cos \delta}{R} \right)$$

$$C_1 = \frac{\sin \alpha}{l_A} \left( \frac{\cos^2 \alpha}{l_A} - \frac{\cos \alpha}{R} \right) + \frac{\sin \beta}{l_B} \left( \frac{\cos^2 \beta}{l_B} - \frac{\cos \beta}{R} \right); C'_1 = \frac{\sin \gamma}{l_C} \left( \frac{\cos^2 \gamma}{l_C} - \frac{\cos \gamma}{R} \right) - \frac{\sin \delta}{l_D} \left( \frac{\cos^2 \delta}{l_D} - \frac{\cos \delta}{R} \right)$$

$$C_2 = \frac{\sin \alpha}{l_A} \left( \frac{1}{l_A} - \frac{\cos \alpha}{A} \right) + \frac{\sin \beta}{l_B} \left( \frac{1}{l_B} - \frac{\cos \beta}{R} \right); C'_2 = \frac{\sin \gamma}{l_C} \left( \frac{1}{l_C} - \frac{\cos \gamma}{R} \right) - \frac{\sin \delta}{l_D} \left( \frac{1}{l_D} - \frac{\cos \delta}{R} \right)$$

In this expression (1) $\sin \alpha + \sin \beta = kN\lambda$ because A and B are conjugate object-image points, the grating having N lines per unit of length for a wavelength $\lambda$; similarly $\sin \gamma - \sin \delta = kN\lambda_o$ because C and D are the point sources of the registration beams of the grating.

In this expression (1) T and T' characterize defocusing, A and A' the astigmatism, $C_1$ and $C'_1$ the first order coma, $C_2$ and $C'_2$ the second order coma. The next terms in the development of $\Delta$ as a series refer to spherical aberrations which will not be considered here. It will be observed that the terms T, A, $C_1$ and $C_2$ depend only upon the coordinates of the points A and B in use, while the terms T', A', $C'_1$ and $C'_2$ depend only upon the coordinates of the points C and D of registration of the grating.

For determination of the characteristics of the grating, the line density N of the grating will be determined a priori, and the registration wavelength $\lambda_o$ as well as the spectral field to be covered, $\lambda_1$ to $\lambda_3$.

Figure 2:
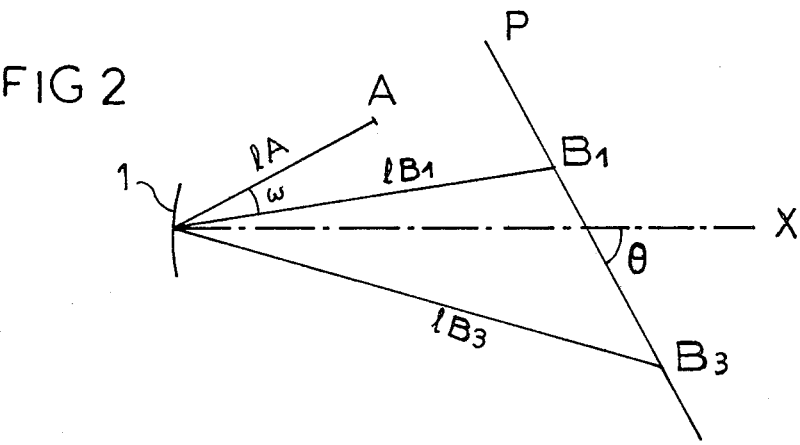

Referring to FIG. 2 the angle of deflection $\omega$ of the wavelength $\lambda_1$ with respect to the incident beam is a priori determined, as well as the inclination $\theta$ of the plane of the spectrum with respect to the normal to the grating, the plane being represented here by its line of intersection P with the plane XOY.

By definition, the spectrum that is observed is the locus of the tangential focal lines and for a wavelength $\lambda$ the position of the tangential focal line is determined when the term $T - k\lambda/\lambda_o T'$ vanishes in the expression (1). For the spectrum to be plane the tangential focal lines corresponding with all the wavelengths must be in one and the same plane. In practice it is expressed that the tangential focal lines of three wavelengths $\lambda_1 \lambda_2 \lambda_3$ in the field being considered are in one and the same plane, or that their points of intersection with the plane XOY are at the same point P; the tangential focal lines for the other wavelengths are not in this plane but their distances from this plane are sufficiently small, taking into account the aperture of the spectrograph (the dimensions of the grating with respect to the distance $1_B$), for the spread of the spectral rays to be small, that is to say, for the resolution to be acceptable. For $\lambda_1$ and $\lambda_3$ are taken the extreme wavelengths of the spectral field, or values near the extremes, and for $\lambda_2$ an intermediate value.

In a first part of the calculation particular attention is first paid to the configuration of the points of use A and $B_1$, $B_2$, $B_3$ corresponding with $\lambda_1 \lambda_2 \lambda_3$ and assuming the registration data is known. Under these conditions T' is a constant and for each wavelength retained the vanishing of the defocusing term may be written $T = k\lambda/\lambda_o T'$ for each wavelength, or:

$$\frac{\cos^2 \alpha}{l_A} - \frac{\cos \alpha}{R} + \frac{\cos^2 \beta_1}{l_{B_1}} - \frac{\cos \beta_1}{R} = \frac{k\lambda_1}{\lambda_0} T'$$
with $\sin \alpha + \sin \beta_1 = kN\lambda_1$ $$\frac{\cos^2 \alpha}{l_A} - \frac{\cos \alpha}{R} + \frac{\cos^2 \beta_2}{l_{B_2}} - \frac{\cos \beta_2}{R} = \frac{k\lambda_2}{\lambda_0} T'$$
with $\sin \alpha + \sin \beta_2 = kN\lambda_2$ $$\frac{\cos^2 \alpha}{l_A} - \frac{\cos \alpha}{R} + \frac{\cos^2 \beta_3}{l_{B_3}} - \frac{\cos \beta_3}{R} = \frac{k\lambda_3}{\lambda_0} T'$$
with $\sin \alpha + \sin \beta_3 = kN\lambda_3$ To these equations is added another relationship between $\alpha$ and $\beta_1$ since $\omega$ is fixed. Thus one can determine the angle $\alpha$ and the three angles $\beta_1 \beta_2 \beta_3$ corresponding to the three reference wavelengths. By writing in addition that the three tangential focal lines are at one and the same point forming the angle $\theta$ with the normal to the grating one obtains a system of equations which, by letting $\theta$ vary, enable a satisfactory group of values $1_A$, $1_B$, $1_{B2}$, $1_{B3}$ to be found.

Of course, these calculations are processed in a computer, setting up of the programs for processing these equations being within the capacity of specialists in this domain.

In a second phase one calculates the defocusing for intermediate wavelengths other than the three reference wavelengths, that is to say, the deviations of the tangential focal lines of these other wavelengths with respect to the plane retained, and the aggregate of these deviations is minimized by operating again on the angles $\theta$ and $\omega$. Thus one then has available a new group of compatible values of $\omega$, $\theta$, $1_A$ and $\alpha$, $1_{B1}$ and $\beta_1$, $1_{B2}$ and $\beta_2$, $1_{B3}$ and $\beta_3$ which determine the value of T' and thereby a relationship between the coordinates of the registration points.

In a third phase of calculation one pays particular attention to the correction of first order coma, the term characteristic of which in the expression (1) is $$C_1 - k\lambda/\lambda_o C'_1, \text{ or}$$

$$\frac{\sin \alpha}{1_A} \left( \frac{\cos^2 \alpha}{1_A} - \frac{\cos \alpha}{R} \right) +$$

$$\frac{\sin \beta}{1_A} \left( \frac{\cos^2 \beta}{1_A} - \frac{\cos \beta}{R} \right) - \frac{K\lambda}{\lambda_o} C'_1,$$

by trying to make this term proportional to the wavelength and acting upon the angle of aperture $\omega$. This makes the defocusing vary and compels one to readjust the inclination $\theta$, which in general brings about a deterioration in the linearity of the coma. Hence, one is compelled to readjust the angle ω and the inclination θ in succession until both acceptable defocusing and linear variation of the coma with the wavelength are obtained.

There is then available another group of values of ω and θ and of coordinates of the points $AB_1B_2B_3$ for the three wavelengths retained, and of the two corresponding values T' and C', hence of two relationships between the coordinates of the registration points.

Finally in a fourth phase one may try to annul the astigmatism for an intermediate wavelength $\lambda_4$ chosen so as to balance out the remainders over the whole of the spectrum. This requires the solution of the equation $A - k \lambda_4/\lambda_o A' = 0$ which gives a value A' for determining a new relationship between the coordinates of the registration points.

From the values T', A' and $C'_1$ and the relationship $\sin \gamma - \sin \delta = kN\lambda_o$ one can obtain the coordinates $(1_c \gamma)$ and $(1_D \delta)$ of the registration points of the grating.

The following examples give the characteristics of plane-spectrum spectrographs employing concave holographic gratings according to the invention for various extended fields of wavelength.

Example 1, for a spectral field from 2000 to 8000 A, employs a grating of diameter H = 28 mm having 200 lines per millimeter. With a point source at 85 mm from the grating a spectrum 20 mm long is obtained which is formed in a plane 64 mm away from the center of the grating and inclined at 42° to the normal to the center of the grating. A maximum height of astigmatism of 0.004 H is observed, this height remaining less than 0.001 H between 4000 and 8000 A. Resolution is 3 A.

Example 2, for a spectral field from 2500 to 4500 A, employs a grating of diameter 50 mm having 1800 lines per millimeter. With a point source at 255 mm from the grating a spectrum 200 mm long is obtained in a plane 440 mm away from the center of the grating and inclined at 27°. Resolution is 0.4 A.

Example 3, for a spectral field from 1.5 to 2.7μ in the infra-red, a grating of diameter 75 mm having 300 lines/mm is employed. With a point source at 500 mm from the center a plane spectrum of 400 mm is obtained in a plane 860 mm away from the center and inclined at 27°. Resolution is 1.5 $cm^{-1}$.

Example 4, for a spectral field of 200 to 800 A in the remote ultra-violet, a grating of 100 mm in diameter having 1750 lines/mm is employed. The point source is at 930 mm and the spectrum formed is 125 mm long; it is formed in a plane 882 mm away and inclined negatively by about 21°. Resolution is 0.5 A.

The examples above show that the spectral fields accessible by such plane-field spectrographs may be just as well in the visible spectrum as in the infra-red or remote ultra-violet.

The use of a concave holographic grating in a plane-field spectrograph enables a particularly intersecting modification to be made in which on one and the same spherical support are juxtaposed a number of gratings each giving a plane spectrum. By illuminating the whole through a single inlet slit constituting the source of complex light to be analysed a number of distinct plane spectra can be obtained which correspond each to one portion of the spectral field to be analysed in the incident light.

Figure 3:
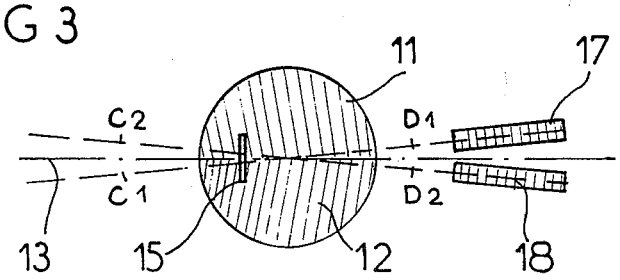
FIG. 3 shows a modification using two distinct holographic gratings on the same concave support.

FIG. 3 is a front view of a concave support bearing two distinct gratings 11 and 12 arranged on opposite sides of a meridian plane 13. Each partial grating is registered from registration points arranged, for example, on opposite sides of the meridian plane. The grating 11 is registered from points $C_1$ and $D_1$ and the grating 12 from $C_2$ and $D_2$. The grating 11 then gives, for a common slit 15, a spectrum 17 covering one portion of the spectral field to be analysed while the grating 12 gives a spectrum 18 covering another complementary portion of this field. For example, for a source 15 containing the field 2000-6000 A to be analysed, the spectrum 17 extends from 2000 to 4000 A and the spectrum 18 from 4000 to 6000 A.

Each grating 11 and 12 operating over a confined field may thus be better adjusted from the point of view of its light output and better corrected for aberrations, whereby better definition and a reduction in size are obtained relative to an apparatus using a single grating. For equal sizes, one thus has the possibility of having greater linear dispersion of the spectrum, which gives greater spectral resolution.

This arrangement is particularly suited to modern detectors such as photodiode mosaics or small-diameter vidicon tubes which compel ordinary spectra to be confined to a single band.

Of course one can also conceive of forming more than two gratings on the same support or else superimposing the two gratings instead of placing them side by side.

What is claimed is:

1. A spectrograph for an extended spectral field, including means for defining a source of light to be analyzed and a dispersive system, wherein the dispersive system consists solely of a concave holographic grating, said grating having registration points with coordinates in a relation with the coordinates of the light source to be analyzed to produce tangential focal lines for different wavelengths from said light source which are disposed in the same plane whereby a planar diffraction spectrum is formed in said plane.

2. A spectrograph for an extended spectral field, including means for defining a source of light to be analyzed and a dispersive system, wherein the dispersive system consists of a plurality of holographic gratings provided on one concave support, each said grating having registration points with coordinates in a relation with the coordinates of the light source to be analyzed to produce tangential focal lines for different wavelengths from said light source which are disposed in the same plane whereby a planar diffraction spectrum is formed in said plane for each grating, the respective planes in which the respective diffraction spectra are formed being offset with respect to one another.

3. A spectrograph as claimed in claim 2, wherein the gratings are constructed so that the spectra formed thereby each covers a distinct and different band of wavelengths which in total cover the entire range of wavelengths of the spectral field to be analyzed.

* * * * *